(12) United States Patent
Jung

(10) Patent No.: US 11,725,735 B2
(45) Date of Patent: Aug. 15, 2023

(54) PACKING DEVICE FOR VEHICLE

(71) Applicant: HYUNDAI MOBIS CO., LTD., Seoul (KR)

(72) Inventor: Min Kyu Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 207 days.

(21) Appl. No.: 17/208,161

(22) Filed: Mar. 22, 2021

(65) Prior Publication Data

US 2021/0301922 A1 Sep. 30, 2021

(30) Foreign Application Priority Data

Mar. 26, 2020 (KR) .................. 10-2020-0037140

(51) Int. Cl.
*F16J 15/3252* (2016.01)
*F16J 15/3216* (2016.01)
*F16J 15/3284* (2016.01)

(52) U.S. Cl.
CPC ....... *F16J 15/3252* (2013.01); *F16J 15/3216* (2013.01); *F16J 15/3284* (2013.01)

(58) Field of Classification Search
CPC .. F16J 15/3216; F16J 15/3252; F16J 15/3284; B60T 11/236; F16D 2125/08
See application file for complete search history.

(56) References Cited

U.S. PATENT DOCUMENTS

| | | | | |
|---|---|---|---|---|
| 2,402,114 A | * | 6/1946 | Le Clair | F16J 15/3252 277/575 |
| 2,637,606 A | * | 5/1953 | Pielop, Jr. | F16J 15/3216 92/241 |
| 4,793,242 A | * | 12/1988 | Kobayashi | F16J 15/3268 277/572 |
| 4,827,834 A | * | 5/1989 | Leigh-Monstevens | F16D 25/083 92/108 |
| 5,303,937 A | * | 4/1994 | Huss | B29D 99/0053 277/924 |
| 5,597,356 A | * | 1/1997 | Rieder | F16D 3/385 464/131 |
| 6,164,183 A | * | 12/2000 | Fulks | B60T 13/745 91/367 |
| 6,196,552 B1 | * | 3/2001 | Peterson | F16J 15/56 277/575 |
| 6,203,022 B1 | * | 3/2001 | Struschka | B60T 11/236 277/560 |
| 6,786,489 B1 | * | 9/2004 | Hennemann | B60T 11/236 277/439 |
| 7,343,741 B2 | * | 3/2008 | Bernadat | B60T 11/232 277/441 |

(Continued)

FOREIGN PATENT DOCUMENTS

KR 10-2007-0104982 A 10/2007

*Primary Examiner* — Nicholas L Foster
(74) *Attorney, Agent, or Firm* — Morgan, Lewis & Bockius LLP

(57) ABSTRACT

A packing device for a vehicle may include: a body part; a power providing part rotatably mounted in the body part, and disposed through the body part; an insertion space part disposed in the body part; and a sealing part disposed in the insertion space part, including an insert-molded structure having different materials, and configured to press against the insertion space part and the power providing part so as to prevent an oil leak.

12 Claims, 7 Drawing Sheets

(56) References Cited

U.S. PATENT DOCUMENTS

| | | | | |
|---|---|---|---|---|
| 8,607,689 B2* | 12/2013 | Miller | ............... | B60T 11/236 |
| | | | | 92/245 |
| 9,180,851 B2* | 11/2015 | Loke | ............... | F15B 15/226 |
| 9,816,566 B2* | 11/2017 | Hess | ............... | F16C 21/005 |
| 2010/0109260 A1* | 5/2010 | Mellander | ............... | F16J 15/061 |
| | | | | 277/619 |
| 2011/0302916 A1* | 12/2011 | Miller | ............... | B60T 11/236 |
| | | | | 277/436 |
| 2012/0186246 A1* | 7/2012 | Loke | ............... | B60T 11/20 |
| | | | | 60/585 |
| 2012/0242140 A1* | 9/2012 | Koizumi | ............... | B60T 8/4031 |
| | | | | 418/140 |
| 2016/0348674 A1* | 12/2016 | Vidal | ............... | F04B 1/047 |

* cited by examiner

PACKING DEVICE FOR VEHICLE

CROSS-REFERENCE TO RELATED APPLICATION

This application claims priority from and the benefit of Korean Patent Application No. 10-2020-0037140, filed on Mar. 26, 2020, which is hereby incorporated by reference for all purposes as if set forth herein.

BACKGROUND

Field

Exemplary embodiments of the present disclosure relate to a packing device for a vehicle, and more particularly, to a packing device for a vehicle, which can prevent an occurrence of oil leak by deformation and abrasion due to hydraulic pressure.

Discussion of the Background

In general, an electronic hydraulic brake device serves to adjust braking pressure of each wheel through hydraulic pressure of a master cylinder which is driven by a motor after pedal pressure of a driver is sensed through a sensor. Furthermore, an electronic parking brake device drives a motor to perform parking braking for each wheel.

The brake device provides a braking force to each wheel through hydraulic pressure or rotation of a screw by the driven motor. At this time, the outer circumferential surface of the screw is surrounded by a packing device such as an O-ring to prevent an oil leak.

In the related art, however, an O-ring made of rubber is used. Therefore, due to the influence of hydraulic pressure, the assembly position of the O-ring is not constantly maintained but changed to degrade a sealing force. Furthermore, when the O-ring is pushed by the hydraulic pressure and inserted into the gap between parts, the O-ring may be abraded to cause an oil leak. Therefore, there is a need for a device capable of solving the problem.

The related art of the present disclosure is disclosed in Korean Patent Application No. 2007-0104982 published on Oct. 30, 2007 and entitled "Valve Control Device of Electronic Hydraulic Brake".

SUMMARY

Various embodiments are directed to a packing device for a vehicle, which can prevent an occurrence of oil leak by deformation and abrasion due to hydraulic pressure.

In an embodiment, a packing device for a vehicle may include: a body part; a power providing part rotatably mounted in the body part, and disposed through the body part; an insertion space part disposed in the body part; and a sealing part disposed in the insertion space part, including an insert-molded structure having different materials, and configured to press against the insertion space part and the power providing part so as to prevent an oil leak.

The body part may include: a first body part having a first body space in which the power providing part is embedded; and a second body part extending from the first body part, and having a second body space through which the power providing part is disposed.

An inner diameter of the first body part may be larger than an inner diameter of the second body part, and the insertion space part may be disposed in the second body part.

The power providing part may include: a motor disposed in the first body space, and configured to be driven when power is applied thereto; a screw rotatably mounted in the motor, and disposed through the second body part; a bracket mounted on the screw; and a bearing disposed between the bracket and the second body part.

The sealing part may include: a first sealing part having a ring shape, and including first molding holes along the circumferential surface of the first sealing part; and a second sealing part insert-molded on the first sealing part through the first molding holes.

The second sealing part may include: a second outer molding part configured to cover an outer circumferential surface of the first sealing part; a second insertion molding part extending from the second outer molding part, and disposed in the first molding holes; and a second inner molding part extending from the second insertion molding part, and configured to cover an inner circumferential surface of the first sealing part.

The second sealing part may further include a second side molding part configured to connect the second outer molding part to the second inner molding part and to cover a first end of the first sealing part.

A second end of the first sealing part may be in direct contact with the insertion space part so as to support the second sealing part.

The second sealing part may further include a second protruding molding part protruding from at least one of the second outer molding part or the second inner molding part.

The sealing part may further include a third sealing part disposed on the first sealing part, and having a shape corresponding to the insertion space part so as to be brought into surface contact with the insertion space part.

The first sealing part may include a metallic or plastic material, and the second sealing part may include a rubber material.

In the packing device for a vehicle in accordance with the embodiment of the present disclosure, the first and second sealing parts which are made of different materials are coupled to each other through the insert molding method, and the first sealing part is directly contacted with the second body part. Thus, the second body part and the second sealing part are spaced apart from each other. Therefore, at the initial stage of the assembly process of the sealing part, the second sealing part may be induced to the preset position. Furthermore, although the second sealing part is deformed by the hydraulic pressure, the second sealing part is not inserted between the screw and the second body part, which makes it possible to prevent the damage or abrasion of the second sealing part.

DETAILED DESCRIPTION OF THE ILLUSTRATED EMBODIMENTS

Hereinafter, a packing device for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
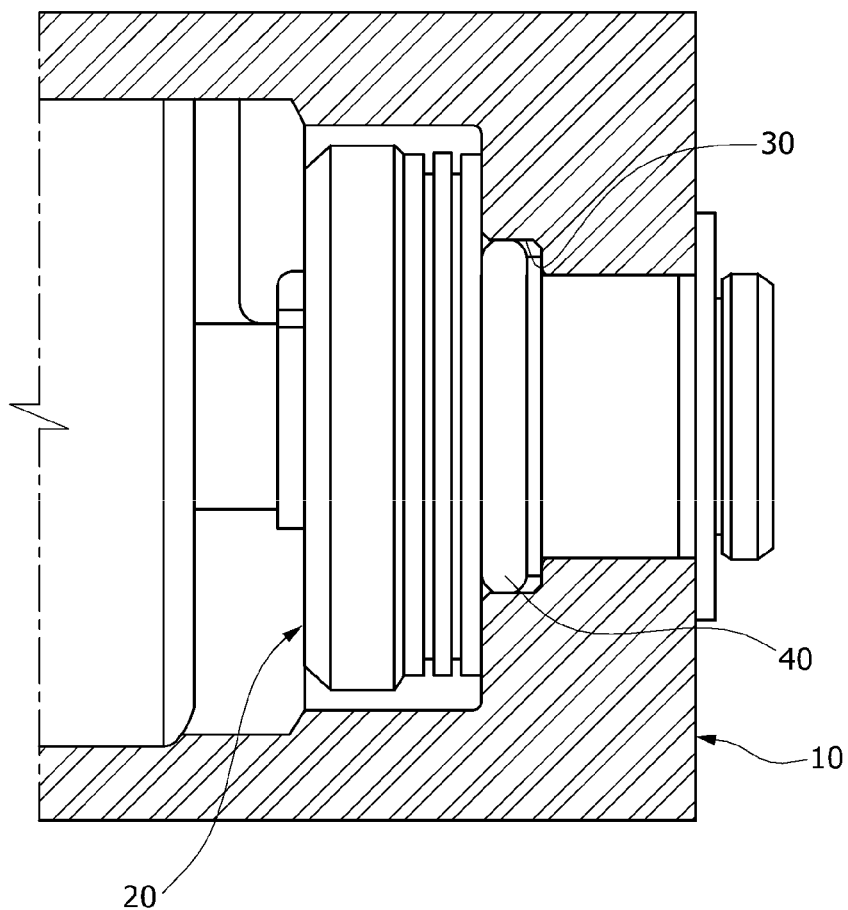
FIG. 1 is a diagram schematically illustrating a packing device for a vehicle in accordance with an embodiment of the present disclosure.

FIG. 1 is a diagram schematically illustrating a packing device for a vehicle in accordance with an embodiment of the present disclosure. Referring to FIG. 1, a packing device 1 in accordance with an embodiment of the present disclosure includes a body part 10, a power providing part 20, an insertion space part 30 and a sealing part 40.

The body part 10 is mounted in a vehicle. For example, the body part 10 may be installed on a drum where a wheel of the vehicle is mounted, and connected to a hydraulic brake device or formed as one body with the hydraulic brake device, such that hydraulic pressure for braking is supplied thereto. Such a body part 10 may be connected to a wheel cylinder or formed as one body with the wheel cylinder part.

The power providing part 20 is rotatably mounted in the body part 10, and disposed through the body part 10. For example, the power providing part 20 may be mounted in the body part 10, connected to the wheel cylinder, and driven when a signal for a parking brake is applied thereto.

The insertion space part 30 is formed in the body part 10, and the power providing part 20 is mounted on the sealing part 40 inserted into the insertion space part 30. Such a sealing part 40 is formed through insert molding between different materials, and presses against the insertion space part 30 and the power providing part 20 so as to prevent an oil leak. For example, the insertion space part 30 may be formed in a groove shape inside the body part 10 such that the sealing part 40 is inserted thereto, and the sealing part 40 may be disposed through the power providing part 20. Thus, the sealing part 40 may seal the space between the outside of the power providing part 20 and the insertion space part 30, thereby preventing an oil leak.

Figure 2:
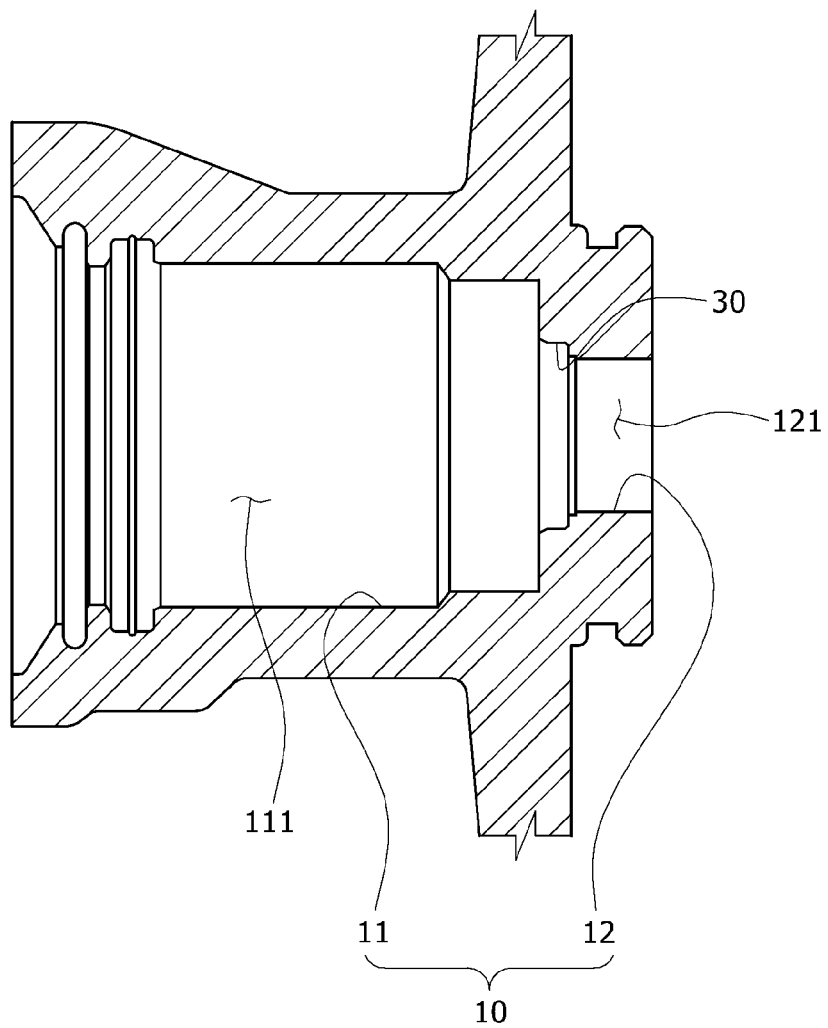
FIG. 2 is a diagram schematically illustrating a body part in accordance with the embodiment of the present disclosure.

FIG. 2 is a diagram schematically illustrating the body part in accordance with the embodiment of the present disclosure. Referring to FIG. 2, the body part 10 in accordance with the embodiment of the present disclosure includes a first body part 11 and a second body part 12.

The first body part 11 has a first body space 111 formed therein, such that the power providing part 20 is embedded in the first body space 111. The second body part 12 is extended from the first body part 11, and has a second body space 121 through which the power providing part 20 is disposed.

At this time, the first body part 11 has a larger inner diameter than the second body part 12. The insertion space part 30 is formed in the second body part 12. For example, the insertion space part 30 may be formed at an inner end of the second body part 12, adjacent to the first body space 111.

Figure 3:
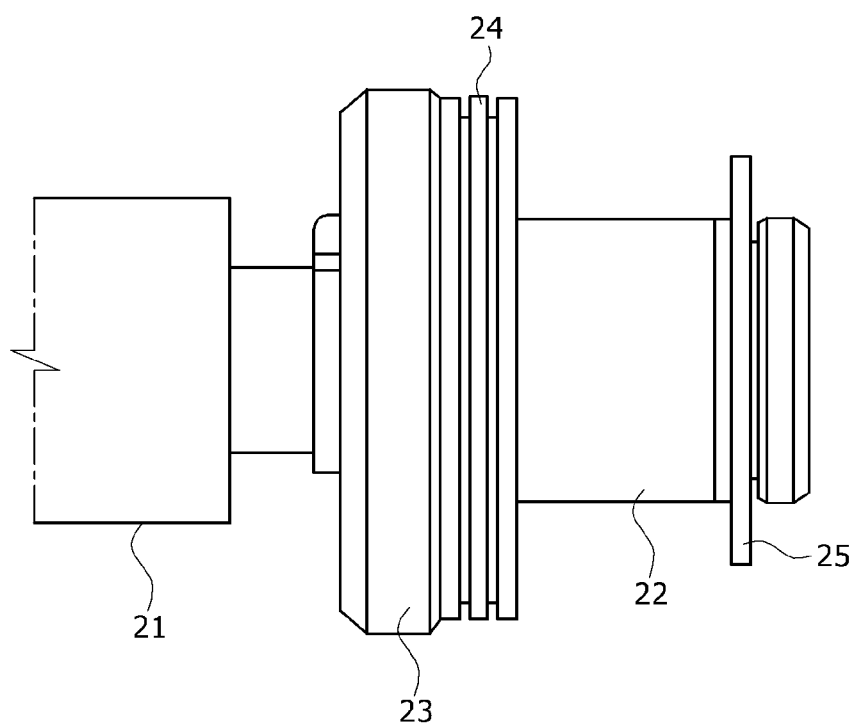
FIG. 3 is a diagram schematically illustrating a power providing part in accordance with the embodiment of the present disclosure.

FIG. 3 is a diagram schematically illustrating the power providing part in accordance with the embodiment of the present disclosure. Referring to FIG. 3, the power providing part 20 in accordance with the embodiment of the present disclosure includes a motor 21, a screw 22, a bracket 23 and a bearing 24.

The motor 21 is disposed in the first body space 111, and driven when power is applied thereto. For example, the motor 21 may be configured as a motor which is driven when a braking signal or parking signal is transmitted thereto.

The screw 22 is rotatably mounted in the motor 21, and disposed through the second body part 12. For example, the screw 22 may be exposed to the outside through the second body part 12, and a stopper 25 mounted at an end of the screw 22 may be locked to the outside of the second body part 12 so as to restrict linear movement of the screw 22.

The bracket 23 is mounted on the screw 22. For example, the bracket 23 may be coupled to the outer circumferential surface of the screw 22, embedded in the first body part 11, and disposed to face the outside of the second body part 12.

The bearing 24 is disposed between the bracket 23 and the second body part 12. For example, the bracket 23 and the second body part 12 may be disposed to face each other, and the bearing 24 may be disposed between the bracket 23 and the second body part 12 so as to suppress rotational friction between the bracket 23 and the screw 22 coupled to the bracket 23.

Figure 4:
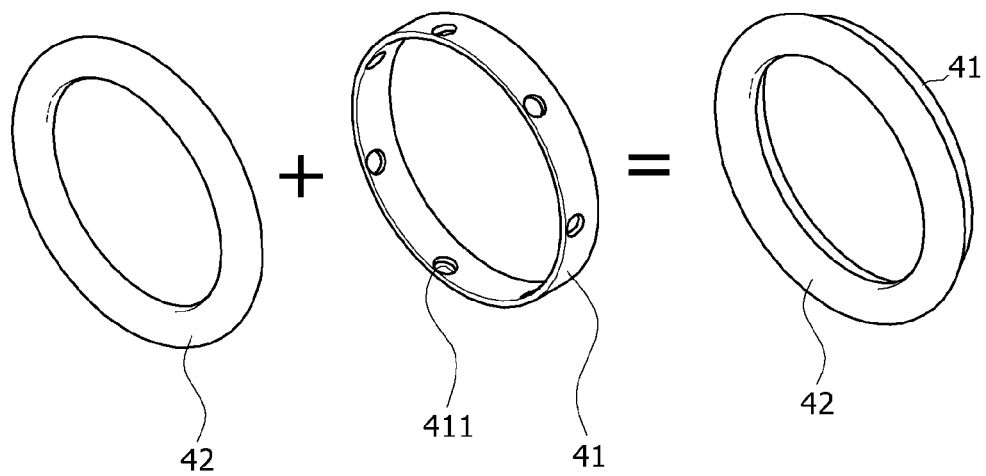
FIG. 4 is a diagram schematically illustrating a sealing part in accordance with the embodiment of the present disclosure.
Figure 5:
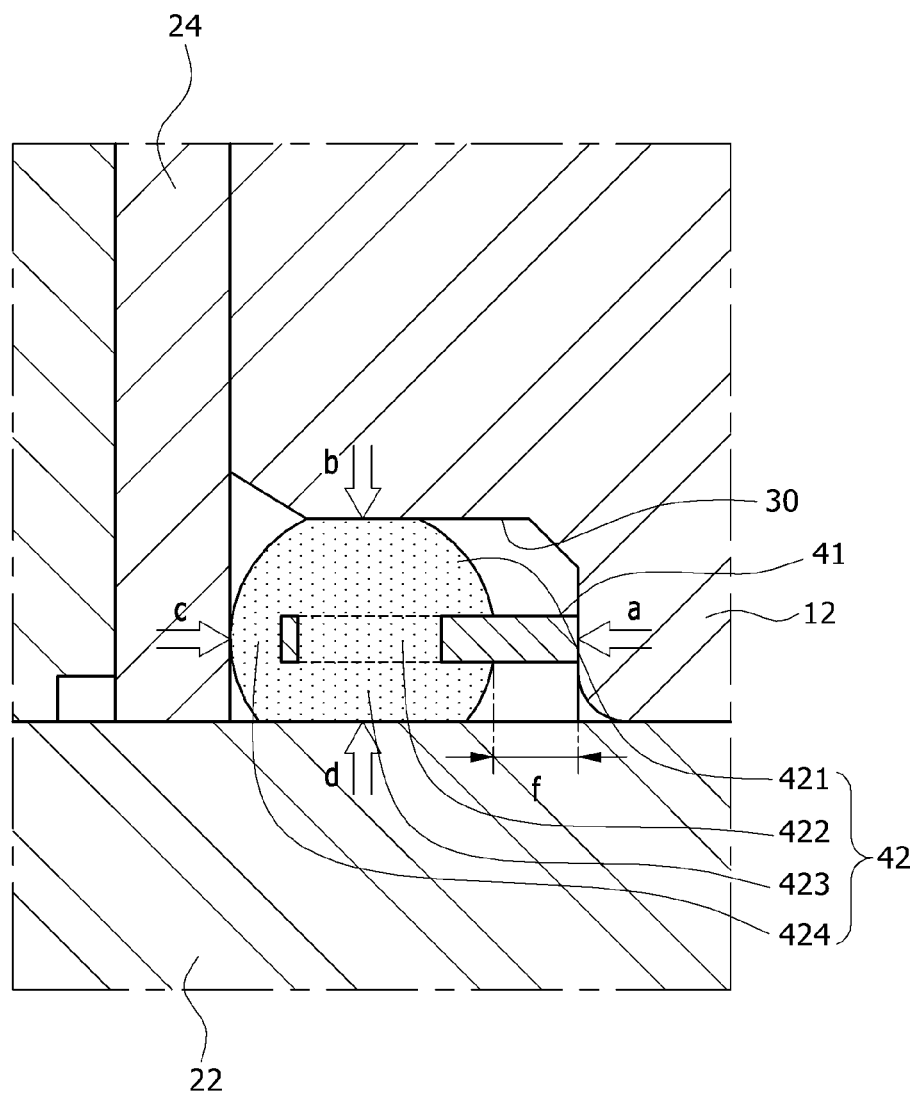
FIG. 5 is a diagram schematically illustrating that the sealing part in accordance with the embodiment of the present disclosure is mounted in an insertion space part.

FIG. 4 is a diagram schematically illustrating the sealing part in accordance with the embodiment of the present disclosure, and FIG. 5 is a diagram schematically illustrating that the sealing part in accordance with the embodiment of the present disclosure is mounted in the insertion space part. Referring to FIGS. 4 and 5, the sealing part 40 in accordance with the embodiment of the present disclosure includes a first sealing part 41 and a second sealing part 42.

The first sealing part 41 is formed in a ring shape, and has first molding holes 411 formed along the circumferential surface thereof. Such a first sealing part 41 may be made of a metallic or plastic material. Furthermore, various materials which can suppress deformation by a preset outer force may be used as the first sealing part 41. For example, the plurality of first molding holes 411 may be disposed at even intervals along the circumferential surface of the first sealing part 41. Such first molding holes 411 may be disposed in the center of the first sealing part 41. If necessary, however, the first molding holes 411 may be disposed between the center and the left end of the first sealing part 41.

The second sealing part 42 is insert-molded on the first sealing part 41 through the first molding holes 411. The second sealing part 42 may be made of a rubber material. For example, the second sealing part 42 may cover all or part of the first sealing part 41, and press against the insertion space part 30, the screw 22 and the bearing 24 through the material thereof, thereby preventing an oil leak.

The second sealing part 42 in accordance with the embodiment of the present disclosure includes a second outer molding part 421, a second insertion molding part 422 and a second inner molding part 423.

The second outer molding part 421 covers the outer circumferential surface of the first sealing part 41. For example, the second outer molding part 421 may cover the same distance on each of the left and right sides of the first molding hole 411. At this time, the right end of the first sealing part 41 may not be covered by the second outer molding part 421 so as to be exposed to the outside.

The second insertion molding part 422 is extended from the second outer molding part 421, and inserted into the first molding hole 411. For example, the second insertion molding part 422 may be formed by injecting an injection material into the first molding hole 411 so as to mold the second sealing part 42.

The second inner molding part 423 is extended from the second insertion molding part 422, and covers the inner circumferential surface of the first sealing part 41. For example, the second inner molding part 423 may cover the same distance on each of the left and right sides of the first molding hole 411. At this time, the right end of the first sealing part 41 may not be covered by the second inner molding part 423 so as to be exposed to the outside.

That is, when the injection material made of rubber is injected into the first sealing part 41 and hardened, the second sealing part 42 may be formed through insert molding.

The second sealing part 42 in accordance with the embodiment of the present disclosure may further include a second side molding part 424. The second side molding part 424 connects the second outer molding part 421 and the second inner molding part 423, and covers one end of the first sealing part 41. For example, the second side molding part 424 may cover the left end of the first sealing part 41.

The other end of the first sealing part 41 is directly contacted with the insertion space part 30 and supports the second sealing part 42. That is, when the other end of the first sealing part 41 is not covered by the second sealing part 42, the second sealing part 42 and the second body part 12 are spaced apart from each other by an exposure distance f of the first sealing part 41. Therefore, at the initial stage of an assembling process, the second sealing part 42 may be located at a preset position. Since the second sealing part 42 is not introduced between the second body part 12 and the screw 22 even though the second sealing part 42 is deformed by hydraulic pressure, the abrasion and damage of the second sealing part 42 may be suppressed.

Furthermore, the sum of a tightening force (a) between the first sealing part 41 and the second body part 12, a tightening force (b) between the second outer molding part 421 and the second body part 12, and a tightening force (c) between the second side molding part 424 and the bearing 24 is larger than a tightening force (d) between the screw 22 and the second inner molding part 423. Therefore, while the sealing part 40 is constrained, a slip may occur at the contact point between the screw 22 and the second inner molding part 423, such that the screw 22 can stably rotate.

Figure 6:
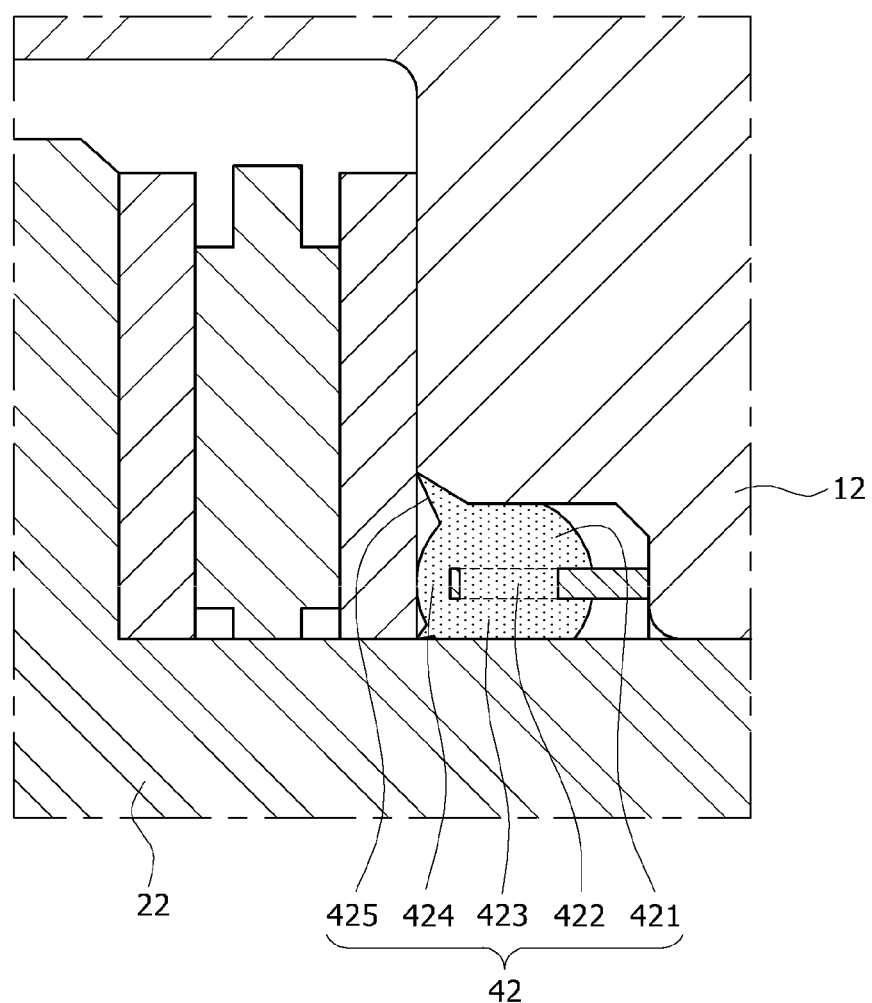
FIG. 6 is a diagram schematically illustrating that a second protruding molding part is additionally formed in the structure of FIG. 5.

FIG. 6 is a diagram schematically illustrating that a second protruding molding part is additionally formed in the structure of FIG. 5. Referring to FIG. 6, the second sealing part 42 in accordance with the embodiment of the present disclosure may further include a second protruding molding part 425.

The second protruding molding part 425 protrudes from one or more of the second outer molding part 421 and the second inner molding part 423. The second protruding molding part 425 may press against the second body part 12 and the screw 22 so as to perform a sealing cup function, thereby improving the sealing performance. In particular, since the second protruding molding part 425 preferentially maintains airtightness when hydraulic pressure is generated, direct pressure by the hydraulic pressure may be suppressed from being applied to the sealing part 40, which makes it possible to extend the lifetime of a product.

Figure 7:
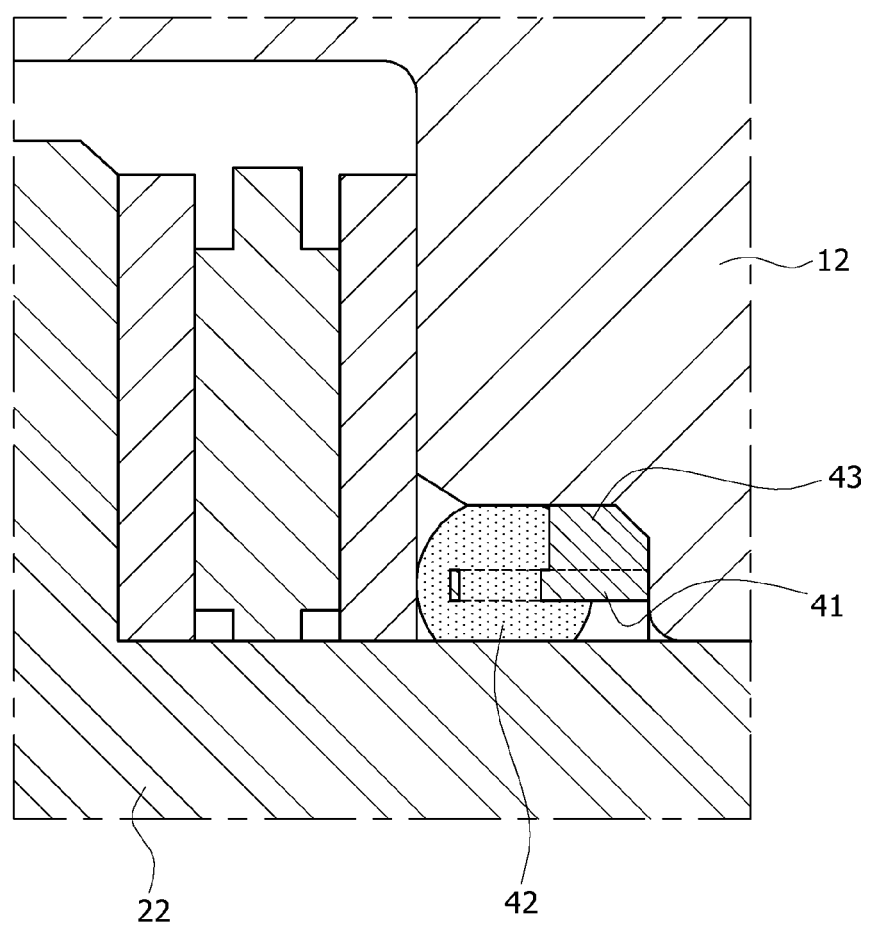
FIG. 7 is a diagram schematically illustrating that a third seating part is additionally formed in the structure of FIG. 5.

FIG. 7 is a diagram schematically illustrating that a third sealing part is additionally formed in the structure of FIG. 5. Referring to FIG. 7, the sealing part 40 in accordance with the embodiment of the present disclosure may further include a third sealing part 43.

The third sealing part 43 is formed on the first sealing part 41, and has a shape corresponding to the insertion space part 30 so as to be brought into surface contact with the insertion space part 30. For example, the third sealing part 43 may be formed as one body with the right end of the first sealing part 41 exposed to the outside, or coupled to the right end of the first sealing part 41. The third sealing part 43 is formed in a shape corresponding to the insertion space part 30, and brought into surface contact with the outer surface of the second body part 12. Therefore, the third sealing part 43 may suppress the movement of the sealing part 40, thereby stably maintaining the sealing performance.

Hereafter, a process of assembling the packing device for a vehicle in accordance with the embodiment of the present disclosure, which has the above-described structure, will be described as follows.

The sealing part 40 is mounted in the insertion space part 30 formed at an inner end corner of the second body part 12, and the power providing part 20 is mounted in the first body part 11. At this time, the motor 21 is embedded in the first body part 11, and the screw 22 rotated by the motor 21 is disposed through the second body part 12 and the sealing part 40. The bearing 24 is disposed between the sealing part 40 and the bracket 23 mounted on the outer circumferential surface of the screw 22.

The sealing part 40 includes the ring-shaped first sealing part 41 and the second sealing part 42 made of rubber, which are formed through an insert molding method. At this time, the second outer molding part 421 covers the outer circumferential surface of the first sealing part 41, the second insertion molding part 422 is inserted into the first molding hole 411, and the second inner molding part 423 covers the inner circumferential surface of the first sealing part 41. The second side molding part 424 connects the second outer molding part 421 and the second inner molding part 423 so as to cover the left end of the first sealing part 41.

Therefore, when the right end of the first sealing part 41 supports the second body part 12 having the insertion space part 30, the second sealing part 42 and the second body part 12 are spaced apart from each other. Thus, at the initial stage of the assembling process, the second sealing part 42 may be induced to a preset position, and the position of the second sealing part 42 may be continuously maintained.

Although the second sealing part 42 is deformed by hydraulic pressure, the gap between the second sealing part 42 and the insertion space part 30 formed in the second body part 12 may be maintained. Therefore, since the second sealing part 42 is not introduced between the second body part 12 and the screw 22, the abrasion and damage of the second sealing part 42 may be suppressed.

In the packing device 1 for a vehicle in accordance with the embodiment of the present disclosure, the first and second sealing parts 41 and 42 which are made of different materials are coupled to each other through the insert molding method, and the first sealing part 41 is directly contacted with the second body part 12. Thus, the second body part 12 and the second sealing part 42 are spaced apart from each other. Therefore, at the initial stage of the assembly process of the sealing part 40, the second sealing part 42 may be induced to the preset position. Furthermore, although the second sealing part 42 is deformed by the hydraulic pressure, the second sealing part 42 is not inserted between the screw 22 and the second body part 12, which makes it possible to prevent the damage or abrasion of the second sealing part 42.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A packing device for a vehicle, comprising:
a body part;
a power providing part rotatably mounted in the body part, and disposed through the body part;
an insertion space part disposed in the body part; and
a sealing part disposed in the insertion space part, including an insert-molded structure having different materials, the sealing part being configured to press against the insertion space part and the power providing part so as to prevent an oil leak,
wherein the sealing part comprises:
a first sealing part having a ring shape, and including first molding holes along a circumferential surface of the first sealing part; and
a second sealing part insert-molded on the first sealing part through the first molding holes, and
wherein the second sealing part includes a second outer molding part configured to cover an outermost circumferential surface of the first sealing part in a radial direction of the power providing part.

2. The packing device of claim 1, wherein the body part comprises:
a first body part having a first body space in which the power providing part is embedded; and
a second body part extending from the first body part, and having a second body space through which the power providing part is disposed.

3. The packing device of claim 2, wherein an inner diameter of the first body part is larger than an inner diameter of the second body part, and
the insertion space part is disposed in the second body part.

4. The packing device of claim 1, wherein the second sealing part further comprises:
a second insertion molding part extending from the second outer molding part, and disposed in the first molding holes; and
a second inner molding part extending from the second insertion molding part, and configured to cover an inner circumferential surface of the first sealing part.

5. The packing device of claim 4, wherein the second sealing part further comprises a second side molding part configured to connect the second outer molding part to the second inner molding part and to cover a first end of the first sealing part.

6. The packing device of claim 5, wherein a second end of the first sealing part is in direct contact with the insertion space part so as to support the second sealing part.

7. The packing device of claim 4, wherein the second sealing part further comprises a second protruding molding part protruding from at least one of the second outer molding part or the second inner molding part.

8. The packing device of claim 1, wherein the sealing part further comprises a third sealing part disposed on the first sealing part, and having a shape corresponding to the insertion space part so as to be brought into surface contact with the insertion space part.

9. The packing device of claim 1, wherein the first sealing part includes a metallic or plastic material, and the second sealing part includes a rubber material.

10. The packing device of claim 1, wherein the second outer molding part is interposed in the radial direction of the power providing part between a portion of the outermost circumferential surface of the first sealing part and a portion of the insertion space part, so as to press against the insertion space part.

11. The packing device of claim 5, wherein the second side molding part is interposed in an axial direction of the power providing part between a portion of the first end of the first sealing part and a portion of the power providing part, so as to press against the power providing part.

12. A packing device for a vehicle, comprising:
a body part;
a power providing part rotatably mounted in the body part, and disposed through the body part;
an insertion space part disposed in the body part; and
a sealing part disposed in the insertion space part, including an insert-molded structure having different materials, the sealing part being configured to press against the insertion space part and the power providing part so as to prevent an oil leak,
wherein the body part comprises:
a first body part having a first body space in which the power providing part is embedded; and
a second body part extending from the first body part, and having a second body space through which the power providing part is disposed, and
wherein the power providing part comprises:
a motor disposed in the first body space, and configured to be driven when power is applied thereto;
a screw rotatably mounted in the motor, and disposed through the second body part;
a bracket mounted on the screw; and
a bearing disposed between the bracket and the second body part.

* * * * *